United States Patent
Schulze-Reimann

(10) Patent No.: US 12,480,495 B2
(45) Date of Patent: Nov. 25, 2025

(54) CENTRIFUGAL RESERVOIR PUMP USED FOR PROCESSING A HYDROGEN STREAM IN AN AIRCRAFT

(71) Applicant: Airbus Operations GmbH, Hamburg (DE)

(72) Inventor: Kai Schulze-Reimann, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 141 days.

(21) Appl. No.: 18/173,275

(22) Filed: Feb. 23, 2023

(65) Prior Publication Data

US 2023/0271112 A1 Aug. 31, 2023

(30) Foreign Application Priority Data

Feb. 25, 2022 (EP) .................................. 22158906

(51) Int. Cl.
| | |
|---|---|
| *F04D 1/12* | (2006.01) |
| *B01D 19/00* | (2006.01) |
| *F04D 13/08* | (2006.01) |
| *F04D 29/42* | (2006.01) |
| *F04D 29/58* | (2006.01) |
| *F04D 31/00* | (2006.01) |

(52) U.S. Cl.
CPC .......... *F04D 1/12* (2013.01); *B01D 19/0052* (2013.01); *F04D 13/086* (2013.01); *F04D 29/4293* (2013.01); *F04D 29/5893* (2013.01); *F04D 31/00* (2013.01)

(58) Field of Classification Search
CPC ...... F04D 1/12; F04D 13/086; F04D 29/4293; F04D 29/5893; F04D 31/00; B01D 19/0052

See application file for complete search history.

(56) References Cited

U.S. PATENT DOCUMENTS

| | | | | |
|---|---|---|---|---|
| 3,817,659 A | * | 6/1974 | Erickson ................... | F04D 1/12 417/89 |
| 3,936,214 A | * | 2/1976 | Zupanick .................. | F04D 1/12 494/900 |

(Continued)

FOREIGN PATENT DOCUMENTS

| | | |
|---|---|---|
| EP | 0554937 A1 | 8/1993 |
| WO | 2015058741 A1 | 4/2015 |

OTHER PUBLICATIONS

European Search Report dated Aug. 18, 2022; priority document.

(Continued)

*Primary Examiner* — Andrew J Marien
(74) *Attorney, Agent, or Firm* — Greer, Burns & Crain, Ltd.

(57) ABSTRACT

A centrifugal reservoir pump for processing a hydrogen stream in an aircraft. In particular, a centrifugal reservoir pump including a pump casing, a hydrogen stream inlet, a rotor being rotatably arranged in the interior part of the pump and including rotor vanes for accelerating the hydrogen stream, and two hydrogen stream outlets. Further provided is a tank unit including the centrifugal reservoir pump and a reservoir for hydrogen. Further provided is an aircraft including a centrifugal reservoir pump or a tank unit. Further provided is a method of processing hydrogen in an aircraft.

12 Claims, 4 Drawing Sheets

(56) References Cited

U.S. PATENT DOCUMENTS

| | | | |
|---|---|---|---|
| 3,977,810 A * | 8/1976 | Erickson | F04D 1/12 |
| | | | 415/89 |
| 3,994,618 A | 11/1976 | Erickson | |
| 4,045,145 A * | 8/1977 | Erickson | F04D 1/12 |
| | | | 415/89 |
| 5,548,961 A | 8/1996 | Luger et al. | |
| 2015/0336680 A1 * | 11/2015 | Schumacher | F17C 3/00 |
| | | | 244/135 B |

OTHER PUBLICATIONS

Airbus Deutschland GmbH, "Final Technical Report—Liquid Hydrogen Fuelled Aircraft—System Analysis (Cryoplane)"; http://www.airneth.nl/index.php.doc_download/10-cryoplane-2003-liquid-hydrogen-fuelled-aircraft-system-analysis-cryoplane-2003-liquid-hydrogen-fuelled-aircraft-system-analysis-html, Sep. 24, 2003.

* cited by examiner

CENTRIFUGAL RESERVOIR PUMP USED FOR PROCESSING A HYDROGEN STREAM IN AN AIRCRAFT

CROSS-REFERENCES TO RELATED APPLICATIONS

This application claims the benefit of the European patent application No. 22158906.2 filed on Feb. 25, 2022, the entire disclosures of which are incorporated herein by way of reference.

FIELD OF THE INVENTION

The present invention relates to a centrifugal reservoir pump for processing a hydrogen stream in an aircraft. In particular, the present invention relates to centrifugal reservoir pump comprising a pump casing, a hydrogen stream inlet, a rotor being rotatably arranged in the interior part of the pump and comprising rotor vanes for accelerating the hydrogen stream, and two hydrogen stream outlets. Further, the present invention relates to a tank unit comprising the centrifugal reservoir pump and a reservoir for hydrogen. Further, the present invention relates to an aircraft comprising a centrifugal reservoir pump or a tank unit. Even further, the present invention relates to a method of processing hydrogen in an aircraft.

BACKGROUND OF THE INVENTION

One of the fundamental challenges in aircraft industries relates to the decarbonization in the propulsion technic. There is a huge interest of replacing fossil fuel against alternative fuel being neutral in view of the impact on global climate. One promising alternative is given by hydrogen.

Hydrogen as a fuel is accompanied by many advantages as, e.g., the low density, ease of production and its low costs. Therefore, recent approaches concentrate on hydrogen as fuel. In order to store hydrogen in an acceptable weight and energy density, it requires to use liquid hydrogen as it has an acceptable density of around 70 kg/m$^3$.

Liquid hydrogen needs to be cooled down off board the aircraft and then filled into the tank of the aircraft. Once filled into the tank, the liquid hydrogen starts to warm up, as it is usually not actively cooled, and at a certain temperature, depending on pressure, the liquid hydrogen starts to boil, resulting in an increase of pressure. In order to limit the heat ingress and the resulting pressure rise, the tank is insulated with a multi-layer insulation and vacuum surrounding the hydrogen tank. An inner tank surrounded by the multi-layer insulation and vacuum is installed in an outer tank that carries the inner tank. The inner tank is carried by a polar mount resp. bearing through which all pipes are passed. Hydrogen is passed through a pipe that starts at the bottom of the inner tank, then passes up through the polar mount and down again to the tank system components.

Generally, a hydrogen tank can be operated as a pressure fed or a pump fed variant. The pressure fed variant has more weight, as the tank needs to operate at a higher pressure. Thus, the pump fed variant has less weight which is highly desired for aircraft applications.

As the hydrogen inside the tank gets continuously warmer, it will reach a temperature at which it is no longer liquid in an equilibrium. The hydrogen starts boiling with a rising amount of gaseous hydrogen and decreasing amount of liquid hydrogen. However, liquid fuel represents the used fuel passed to an engine of the aircraft. Pumps for feeding hydrogen to the engine can only tolerate a limited amount of gaseous hydrogen in a hydrogen stream before they start to exhibit cavitation resulting in reduced performance and lifetime.

Besides the rising amount of gaseous hydrogen due to an increase in temperature, there are negative g events exerted to an aircraft which result in mixtures of liquid and gaseous phases in a hydrogen stream. A pump for feeding hydrogen to the engine may struggle as liquid hydrogen and gaseous hydrogen inside the tank change position due to g forces, i.e., in turbulence, leaving the tank output passing gaseous hydrogen in the direction of the pump. In worst case, the aircraft's thrust could be interrupted.

There is a need for separating gaseous hydrogen from liquid hydrogen, whereby the separated gaseous hydrogen may be passed back into the tank. The apparatus must be light and small. The invention's underlaying problem relates to a provision of an apparatus fulfilling the above need and overcoming the above problems. In particular, the invention's underlaying problem relates to the provision of an apparatus providing a reliable supply of a non-fossil fuel to the engine of an aircraft.

SUMMARY OF THE INVENTION

According to a first aspect of the invention, there is provided a centrifugal reservoir pump, used for processing a hydrogen stream in an aircraft, comprising a pump casing encompassing an interior part of the pump, a hydrogen stream inlet, a rotor being rotatably arranged in the interior part of the pump and comprising rotor vanes for accelerating the hydrogen stream perpendicular to the rotating axis of the rotor and for accelerating the hydrogen stream in circumferential direction, a first hydrogen stream outlet and a second hydrogen stream outlet.

The centrifugal reservoir pump solves the above problems. The hydrogen stream comprising a gaseous hydrogen phase and a liquid hydrogen phase enters the centrifugal reservoir pump, in the following also simply designated as "pump", via the hydrogen stream inlet. It may also be possible that the hydrogen stream consists of liquid or gaseous hydrogen, only. The rotor is rotatably arranged in the interior part of the pump.

Through the rotation of the rotor, the hydrogen stream is accelerated. Firstly, the hydrogen stream is accelerated perpendicular to the rotating axis by exerting centrifugal forces. The hydrogen stream is thus accelerated towards the pump casing and away from the rotating axis of the pump. Secondly, the hydrogen stream is accelerated in circumferential direction. The hydrogen stream is passed into a rotational movement as in a centrifuge. This kind of "artificial" g force produced by the rotation represents the driving force for the separation into a liquid hydrogen and gaseous hydrogen. The liquid hydrogen is forced to be found adjacent to the pump casing and the gaseous hydrogen rests adjacent to the rotational axis of the interior of the pump. The separation of the liquid hydrogen and the gaseous hydrogen is accomplished by the applied centrifugal force (i.e., g force), (acting as an artificial g-load) that separates liquid and gaseous hydrogen due to their density difference.

The required g force, i.e., the artificial g-load, produced by the pump must be higher than the negative g forces exerted on the aircraft during flight. The amount of liquid hydrogen within the pump must be sufficient to accomplish the demand for the engine in short term. The pump as described herein solves the problem of supplying a liquid hydrogen stream only to the engine or to a further pump supplying liquid hydrogen to the engine. The two outlets are required for separately unloading the liquid hydrogen stream and the gaseous hydrogen stream.

In a preferred embodiment, there is provided a pump, wherein the distance of the first hydrogen stream outlet to the rotating axis is larger than the distance of the second hydrogen stream outlet to the rotating axis. This embodiment is one alternative practically enabling the pump to release separately the liquid hydrogen stream and the gaseous hydrogen stream.

In a preferred embodiment, more than two outlets are arranged in the pump. This embodiment is associated with the beneficial effect that the detection of the level of the gas/liquid interface is not required. At least the outlet closest to the wall of the pump leads liquid hydrogen. If further outlets lead liquid hydrogen as well, the liquid hydrogen can be detected and passed downstream to a rotational pump or to the engine.

In a further preferred embodiment, there is provided a pump, wherein the pump is used for processing a hydrogen stream comprising a liquid hydrogen stream portion and a gaseous hydrogen stream portion and the first hydrogen stream outlet is arranged for allowing to unload the liquid hydrogen stream portion out of the pump and the second hydrogen stream outlet is arranged for allowing to unload the gaseous hydrogen stream portion out of the pump. In these latter two preferred embodiments, the two outlets for hydrogen are arranged such that a tip part of the first outlet is in contact with the liquid hydrogen on the one hand and a tip part of the second outlet is in contact with the gaseous hydrogen. The forced movement of the streams result in a separation of the liquid hydrogen in the direction of the outer part, i.e., the cage where the liquid hydrogen is then collected. The gaseous hydrogen stream is collected closer to the rotating axis. The simplest way of collecting the phases is given by flush outlets. The pressure in the interior of the pump is higher than outside the pump which let the respective phase to pass out of the pump.

According to a preferred embodiment, there is provided a pump, wherein the first hydrogen stream outlet and/or the second hydrogen stream outlet comprises a pitot tube, wherein the pitot tube vertically faces the circumferential direction.

The pitot tube faces the respective stream in the interior part of the pump, i.e., the liquid hydrogen stream and/or the gaseous hydrogen stream has a direction of movement towards the pitot tube. The velocity vector of the hydrogen stream points into the pitot tube. This arrangement allows the respective stream flowing downstream the outlet. The pitot tube picks up the respective stream. The use of a pitot tube renders the pump to be a pitot tube pump. The pitot tube pump is understood as a specific centrifugal reservoir pump.

In a further preferred embodiment, the pump comprises the pump casing comprising a pump housing and a cage, wherein the cage is rotatably arranged. The pump housing and the cage together form the pump casing. According to the invention, the pump may comprise a cage, which is rotatably arranged, or there is no cage at all.

The pump housing functions as a cover or shelter for the pump. The cage forms the wall for the interior part of the pump. In that the cage is rotatably arranged in the pump, there is provided the possibility of accelerating the liquid hydrogen stream in the circumferential direction.

According to a further preferred embodiment, the pump comprises rotor vanes representing rotor tubes for passing the hydrogen stream within the rotor tube from the hydrogen stream inlet into the interior part of the pump. By this arrangement, the hydrogen stream is effectively accelerated downstream the hydrogen inlet. In this embodiment, the rotor vane does not necessarily have the form of a blade.

The hydrogen stream enters the pump from the center of the pump. According to a preferred embodiment, a pump is provided, wherein the rotor comprises a shaft forming a shaft tube connecting the hydrogen stream inlet with the interior part of the pump, wherein preferably a low pressure mechanical seal is arranged downstream the hydrogen stream inlet and upstream the shaft tube. The mechanical seal can or cannot be installed, to reduce leakage into the space between the cage and pump housing.

According to a further preferred embodiment, there is provided a pump, wherein the cage being rotatably arranged comprises through-holes for passing liquid hydrogen into a gap between the pump housing and the cage enabling a hydrostatic bearing; or wherein the cage being rotatably arranged is devoid of through-holes. This embodiment enables a beneficial bearing of the cage of the pump. The through-holes provide an inlet of liquid hydrogen into the gap between the cage and the pump housing. Thereby, the liquid hydrogen allows a bearing of the cage. The beneficial effect associated with leaving out these through-holes, is to avoid the friction of the liquid hydrogen between the pump housing and the cage.

A further preferred embodiment refers to a pump, wherein the first hydrogen stream outlet and/or the second hydrogen stream outlet comprising the pitot tube further comprises a final tube portion downstream the pitot tube, wherein the final tube portion is arranged adjacent to the hydrogen stream inlet. In this preferred pump, one or both the hydrogen outlet tubes are arranged adjacent to the inlet tube, both tubes, one of the outlet tubes and the inlet tube, or all outlet tubes and the inlet tube are arranged in the center, i.e., parallel to the rotational axis, of the pump. This arrangement provides a simple outlet and inlet design.

The invention's underlaying problem relates to a provision of an apparatus fulfilling the above need and overcoming the above problems. In particular, the invention's underlaying problem further relates to a provision of an apparatus which provides a reliable supply of a non-fossil fuel to an engine of an aircraft.

According to a second aspect of the invention, the above problem is solved by a tank unit for an aircraft comprising a reservoir for hydrogen and a centrifugal reservoir pump. Alternatively, the above problem is solved by a pitot tube pump. According to a preferred embodiment, the above problem is solved by a pump according to the invention.

The tank encompasses hydrogen. As described above, the hydrogen inside the tank is liquid hydrogen, which inevitably gets warmer inside the tank. As it reaches the boiling temperature, a thermodynamic equilibrium sets in between gaseous hydrogen and liquid hydrogen. By use of a centrifugal reservoir pump or a pitot tube pump, preferably by a pump according to the invention, the liquid hydrogen can be separated from the gaseous hydrogen, whereupon the liquid hydrogen is passed to a rotational pump for further passing liquid hydrogen with increased pressure to an engine of an aircraft, or the liquid hydrogen is directly passed to an engine of an aircraft.

According to a preferred embodiment of the invention, there is provided a tank unit, wherein the reservoir for hydrogen is surrounded by a multilayer insulation, preferably a multilayer insulation capable for thermal isolation between the inner part and the outer part of the reservoir for hydrogen. Such multilayer insulations are known by a skilled person. The multilayer insulation enables to keep the heat exchange as low as possible.

The invention's underlaying problem further relates to a provision of an aircraft fulfilling the above need and overcoming the above problems. In particular, the invention's underlaying problem further relates to a provision of an aircraft, in which a reliable supply of a non-fossil fuel to an engine of an aircraft is ensured.

According to a third aspect of the invention, the invention's underlaying problem is solved by an aircraft comprising a pump according to the invention or comprising a tank unit according to the invention.

The supply of hydrogen either directly passed to an engine or passed to an engine via a rotating pump is guaranteed to be hydrogen in the liquid phase.

The invention's underlaying problem even further relates to a provision of method fulfilling the above need and overcoming the above problems. In particular, the invention's underlaying problem even further relates to a provision of a method which provides a reliable supply of a non-fossil fuel to an engine of an aircraft.

According to a fourth aspect of the invention, the invention's underlaying problem is solved by a method of processing hydrogen in an aircraft, wherein a hydrogen stream comprising a liquid hydrogen stream portion and a gaseous hydrogen stream portion is passed through a hydrogen stream inlet into a centrifugal reservoir pump, then the hydrogen stream portion is accelerated by a rotor in the direction perpendicular to the rotating axis of the rotor and in circumferential direction, thereby separating the liquid hydrogen stream portion from the gaseous hydrogen stream portion, and collecting the liquid hydrogen stream portion with a first hydrogen stream outlet and collecting the gaseous liquid hydrogen stream portion with a second hydrogen stream outlet.

The method guarantees that only liquid hydrogen is supplied downstream to an engine of an aircraft.

A challenge to be addressed when performing the method according to the invention refers to the detection of the precise location of the gaseous/liquid interface which may require an adaptation of the position of the gaseous (non-) pitot tube. As liquid hydrogen has a higher density than gaseous hydrogen, the liquid hydrogen fills the space in the interior of the pump close to the wall. The force for acceleration of the rotor or the rotating cage can be measured in order to calculate the mass of the liquid hydrogen resulting in the high of liquid hydrogen measured from the cage's wall. As an alternative, hydrogen temperature and pressure can be measured and a relation of the aircraft's movements give information for calculating the mass of liquid mass in the pump.

The invention's underlaying problem is preferably solved by a method being performed by using a pump according to the invention.

According to a preferred embodiment, the method performs the method step of collecting the liquid hydrogen stream portion and/or the gaseous hydrogen stream portion by a pitot tube vertically facing the hydrogen stream.

The pitot tube is directed against the hydrogen stream being accelerated by the rotor. This is the simplest way of gathering the respective hydrogen portions.

In a preferred embodiment, the liquid hydrogen stream portion is subsequently processed in a rotating pump. After leaving the liquid hydrogen outlet, the liquid hydrogen stream is passed to a rotating pump. Thereby, the pressure of the liquid hydrogen stream is increased.

Features of referred embodiments being disclosed in combination with a specific aspect should be deemed to be disclosed as features of preferred embodiments for all other aspects. As such, e.g., the features designated as preferred embodiments disclosed in combination with the pump as the first aspect are deemed to be disclosed as features of preferred embodiments of the tank unit as the second aspect or preferred embodiments of the aircraft as the third aspect or preferred embodiments of the method as the fourth aspect of the invention.

BRIEF DESCRIPTION OF THE DRAWINGS

Further characteristics, advantages and application options of the present invention are disclosed in the following description of the exemplary embodiments in the figures. All the described and/or illustrated characteristics per se and in any combination form the subject of the invention, even irrespective of their composition in the individual claims or their interrelationships.

DETAILED DESCRIPTION OF THE PREFERRED EMBODIMENTS

Figure 1:
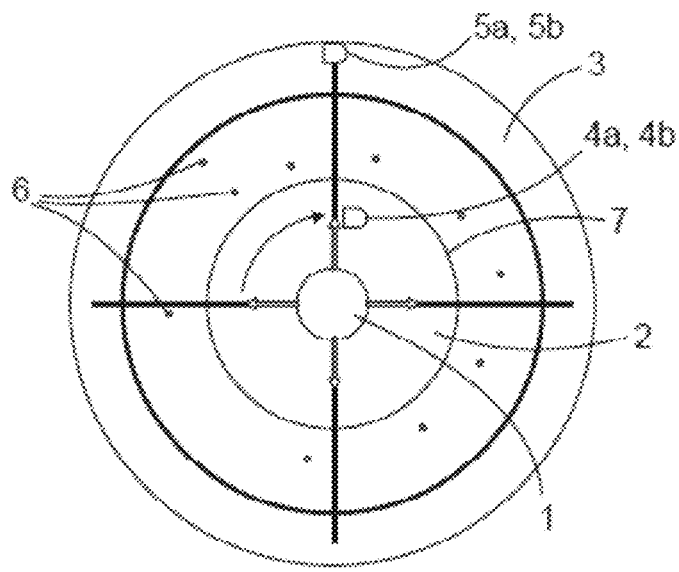
FIG. 1 shows the general principle with examples of potential pitot tube outlets or flush outlets.

In FIG. 1, the general principle is shown. The view is parallel to the hydrogen stream introduced into the pump, i.e., the hydrogen stream inlet 1 points perpendicularly into the paper plane. The rotor 16 (FIG. 2) accelerates the hydrogen stream in the interior of the pump, such that the liquid hydrogen 3 having a higher density compared to the gaseous hydrogen 2 is forced towards the wall of the cage. As a consequence, the hydrogen flows in circumferential direction. Hydrogen gas bubbles 6 in the liquid hydrogen 3 phase are forced to the interface 7 of the liquid hydrogen 3 and the gaseous hydrogen 2. The shown general principle represents an example which may use pitot tube 4a, 5a outlets or flush outlets as examples for non-pitot tube 4b, 5b outlets.

Figure 2:
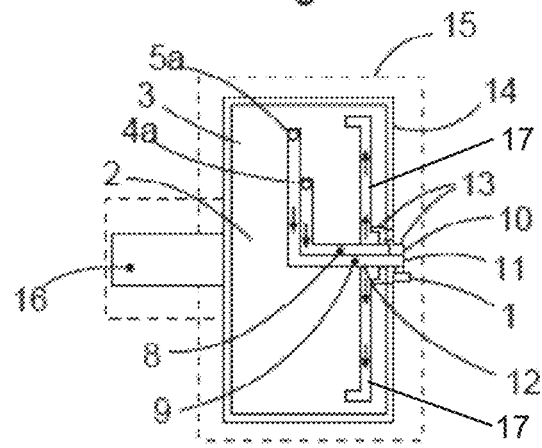
FIG. 2 shows the rotating cage pitot tube pump with two pitot outlets.

FIG. 2 shows, in a cross-sectional view along the rotational axis, the rotating cage pitot tube pump with two pitot tube 4a, 5a outlets leading through tubes 8,9 to hydrogen stream outlets 10,11. The pitot tube 5a gathers the liquid hydrogen 3 at a position away from the rotational axis and close to the wall of the rotating cage. The rotating cage 14 assists in moving the liquid hydrogen 3 in circumferential direction. A beneficial effect associated with this exemplary pump refers to the fact that the lower pressure of the gaseous pitot tube 4a outlet assists in a re-pressurization of the tank operating as a low pressure tank. Simultaneously, the liquid hydrogen pitot 5a outlet increases pressure for the distribution to the consumer (e.g., engine). In this exemplary pump, the rotor vanes 17 have the form of tubes. There is a dynamic seal 13 between the rotating cage and inlet/outlet tubes.

Figure 3:
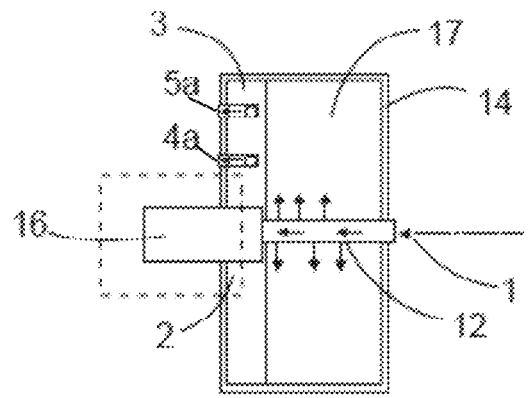
FIG. 3 shows the pitot tube pump with no rotating body but rotating wings, respectively, impeller blades, forcing the hydrogen stream into a rotational movement.

The pitot tube pump in FIG. 3 shows an exemplary embodiment with no rotating body but rotating wings, respectively impeller blades, forcing the hydrogen stream into a rotational movement. There is a bearing 12 associated with the hydrogen stream inlet 1 tube and the rotor vanes 17. This exemplary pump avoids the use of dynamic seals in cryogenic, i.e., liquid hydrogen atmosphere.

Figure 4:
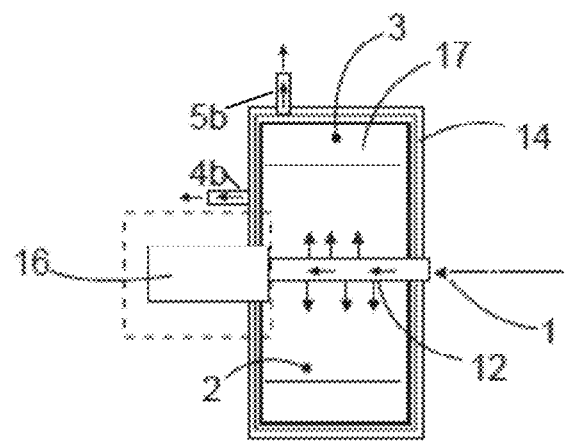
FIG. 4 shows an alternative of the pump according to FIG. 3, whereupon the rotor extends major parts of the interior of the pump.

In FIG. 4, an alternative of the pump according to FIG. 3 is shown, whereupon the rotor fills the interior of the pump. This exemplary embodiment does not allow pitot tube 4a, 5a outlets to be positioned in the interior of the pump, as the rotor vanes would collide with them. This exemplary embodiment thus makes use of non-pitot tube 4b, 5b outlets as, e.g., flush outlets. This exemplary embodiment can be put into practice if the hydrogen in the gap between the pump housing 15 and the rotor vanes 17 does not show excessive turbulence which limits the rotational movement of the hydrogen.

Figure 5:
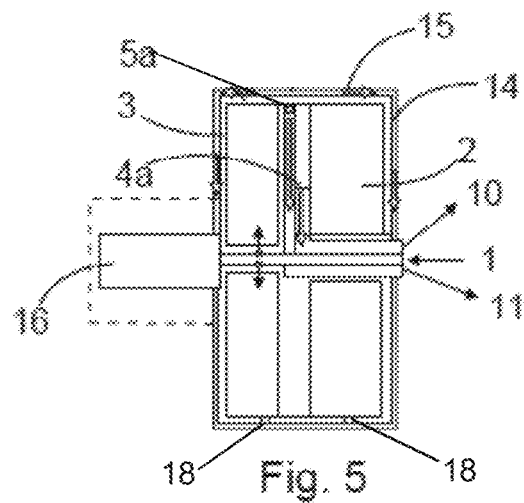
FIG. 5. shows a design with pitot tubes, a rotating cage and through-holes within the rotating cage.

FIG. 5 shows a pump design with pitot tubes, a rotating cage and through-holes within the rotating cage. The cage 14 is a rotating cage having through-holes 18 for passing liquid hydrogen 3 into the gap between the pump housing 15 and the cage 14. The pump housing 15 and the cage 14 together form the pump casing. The liquid hydrogen 3 in the gap forms a hydrostatic bearing. The rotor of this exemplary embodiment is formed of a slotted architecture in order to provide a maximum increase of velocity of the liquid hydrogen 3. In doing so, the pressure in the liquid hydrogen pitot 5a tube may attain a high level. The hydrogen stream inlet 1 and the hydrogen stream outlets 10, 11 are arranged in the center of the pump. There is no dynamic seal at the outside portion of the pump. The seal is between cage and outer portion of the tubes.

Figure 6:
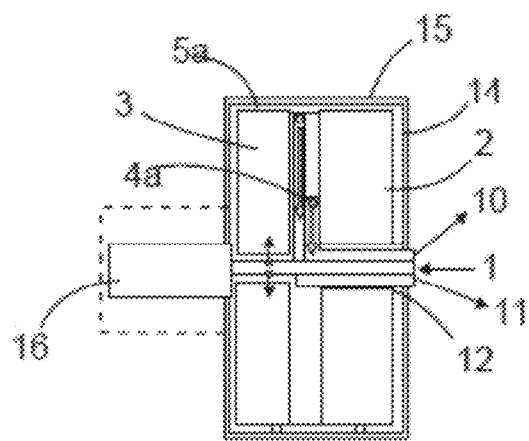
FIG. 6 shows an alternative with a sealed cage.

FIG. 6 shows an alternative with a sealed cage. The rotating cage is carried by bearings and is "sealed" against its surrounding. The difference to the exemplary embodiment as shown in FIG. 5 is that the leakage of these seals can be tolerated. It is expected that the gaseous hydrogen 2 surrounding the rotating cage has a low viscosity such that temperature increase due to the rotation of the cage is not observed as a detrimental effect.

As an alternative to the exemplary embodiments shown in FIGS. 2 to 5, multiple outlets, i.e., more than one outlet, can be accomplished in the pumps.

Figure 7:
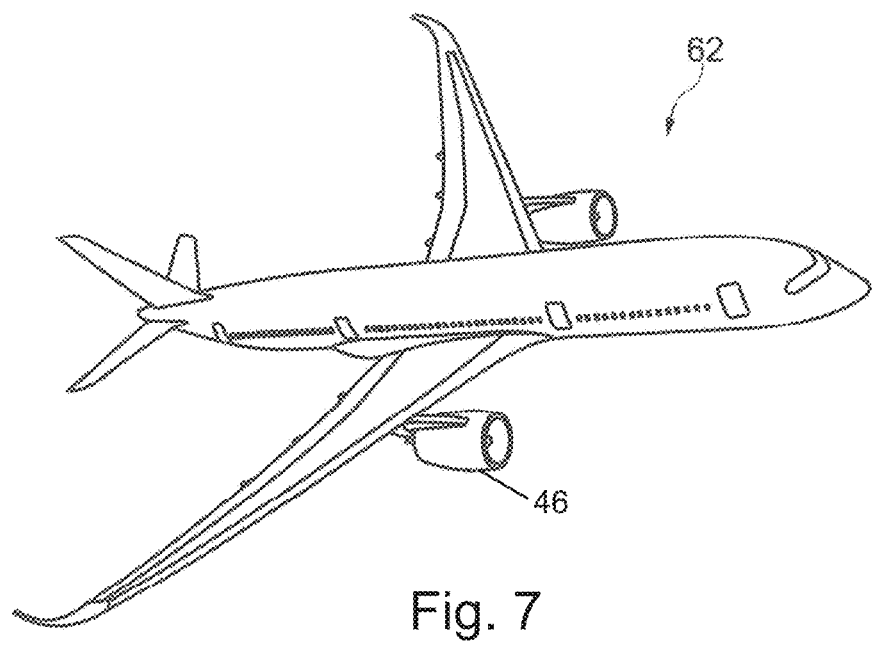
FIG. 7 shows a schematic illustration of an aircraft embodying the principles of the present invention.

FIG. 7 schematically shows an aircraft 62 comprising a pump 15 as described above.

Figure 8:
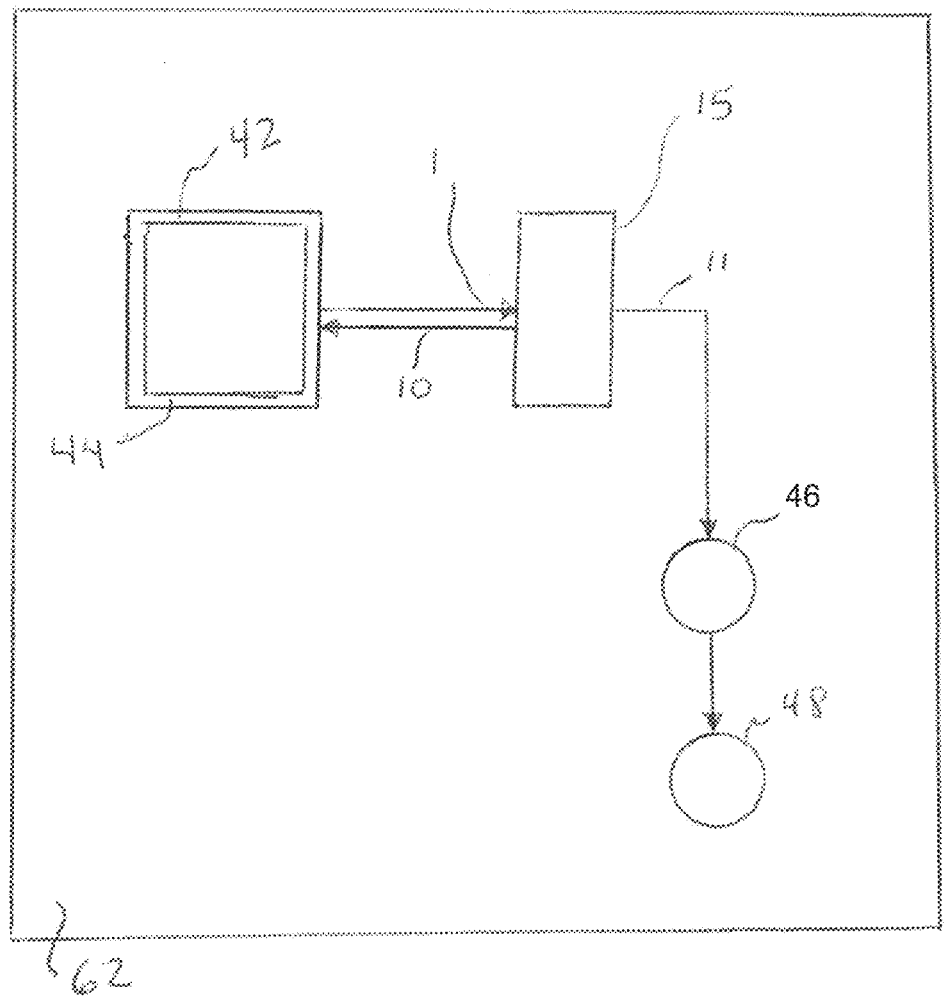
FIG. 8 shows a schematic illustration of a tank embodying the principles of the present invention.

FIG. 8 schematically shows a tank unit 40 for an aircraft 62 comprising a reservoir 42 for hydrogen and the pump 15 as described above. By use of a centrifugal reservoir pump or a pitot tube pump, preferably by a pump according to the invention, the liquid hydrogen from the reservoir 42 can be separated from the gaseous hydrogen, whereupon the liquid hydrogen is passed to a rotational pump 46 for further passing liquid hydrogen with increased pressure to an engine 48 of the aircraft 62, or the liquid hydrogen is directly passed to an engine 48 of the aircraft 62. The reservoir 42 for hydrogen is surrounded by a multilayer insulation 44, preferably a multilayer insulation configured to provide thermal isolation between the inner part and the outer part of the reservoir 42 for hydrogen. Such multilayer insulations are known by a skilled person. The multilayer insulation enables a keeping of the heat exchange as low as possible.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS

1 Hydrogen stream inlet
2 Gaseous hydrogen
3 Liquid hydrogen
4a Gaseous hydrogen pitot tube/outlet
4b Gaseous hydrogen non-pitot tube/outlet
5a Liquid hydrogen pitot tube/outlet
5b Liquid hydrogen non-pitot tube/outlet
6 Hydrogen gas bubbles
7 Interface of the gaseous hydrogen and the liquid hydrogen
8 Final tube portion gaseous outlet
9 Final tube portion liquid outlet
10 First (gaseous) hydrogen stream outlet
11 Second (liquid) hydrogen stream outlet
12 Bearing or hydrostatic bearing
13 Dynamic seal
14 Cage
15 Pump housing
16 Canned motor
17 Rotor vanes
18 Through-holes
42 Reservoir
44 Multilayer insulation
46 Rotational pump
48 Engine
62 Aircraft

The invention claimed is:

1. A centrifugal reservoir pump, used for processing a hydrogen stream in an aircraft, comprising:
a pump casing encompassing an interior part of the pump;
a hydrogen stream inlet;
a rotor being rotatably arranged in the interior part of the pump and comprising rotor vanes for accelerating the hydrogen stream perpendicular to a rotating axis of the rotor and for accelerating the hydrogen stream in a circumferential direction; and
a first hydrogen stream outlet and a second hydrogen stream outlet,
wherein the pump casing comprises a pump housing and a cage, wherein the cage is rotatably arranged, and,
wherein the cage, being rotatably arranged, comprises through-holes for passing liquid hydrogen into a gap between the pump housing and the cage enabling a hydrostatic bearing.

2. The pump according to claim 1, wherein at least one of a distance of the first hydrogen stream outlet to the rotating axis is larger than a distance of the second hydrogen stream outlet to the rotating axis.

3. The pump according to claim 1, wherein the pump is used for processing the hydrogen stream comprising a liquid hydrogen stream portion and a gaseous hydrogen stream portion and the first hydrogen stream outlet is configured to allow an unloading of the liquid hydrogen stream portion out of the pump and the second hydrogen stream outlet is configured to allow an unloading of the gaseous hydrogen stream portion out of the pump.

4. The pump according to claim 1, wherein at least one of the first hydrogen stream outlet or the second hydrogen stream outlet comprises a pitot tube, wherein the pitot tube vertically faces the circumferential direction.

5. The pump according to claim 1, wherein the rotor vanes represent rotor tubes for passing the hydrogen stream within the rotor tubes from the hydrogen stream inlet into the interior part of the pump.

6. The pump according to claim 1,
wherein the rotor comprises a shaft forming a shaft tube connecting the hydrogen stream inlet with the interior part of the pump, and
wherein a low pressure mechanical seal is arranged downstream of the hydrogen stream inlet and upstream of the shaft tube.

7. The pump according to claim 4, wherein at least one of the first hydrogen stream outlet or the second hydrogen stream outlet comprising the pitot tube further comprises a final tube portion downstream the pitot tube, wherein the final tube portion is arranged adjacent to the hydrogen stream inlet.

8. A tank unit for the aircraft comprising
a reservoir for hydrogen, and
the pump according to claim 1.

9. The tank unit according to claim 8, wherein the reservoir for the hydrogen is surrounded by a multilayer insulation.

10. The tank unit according to claim 8, wherein the reservoir for the hydrogen is surrounded by a multilayer insulation configured for thermal isolation between an inner part and an outer part of the reservoir for the hydrogen.

11. An aircraft comprising:
a pump comprising:
    a pump casing encompassing an interior part of the pump;
    a hydrogen stream inlet;
    a rotor being rotatably arranged in the interior part of the pump and comprising rotor vanes for accelerating the hydrogen stream perpendicular to a rotating axis of the rotor and for accelerating the hydrogen stream in a circumferential direction; and
    a first hydrogen stream outlet and a second hydrogen stream outlet,
    wherein the pump casing comprises a pump housing and a cage, wherein the cage is rotatably arranged, and,
    wherein the cage, being rotatably arranged, comprises through-holes for passing liquid hydrogen into a gap between the pump housing and the cage enabling a hydrostatic bearing.

12. An aircraft comprising:
a tank unit comprising:
    a reservoir for hydrogen; and,
    a pump comprising:
        a pump casing encompassing an interior part of the pump;
        a hydrogen stream inlet;
        a rotor being rotatably arranged in the interior part of the pump and comprising rotor vanes for accelerating the hydrogen stream perpendicular to a rotating axis of the rotor and for accelerating the hydrogen stream in a circumferential direction; and
        a first hydrogen stream outlet and a second hydrogen stream outlet,
        wherein the pump casing comprises a pump housing and a cage, wherein the cage is rotatably arranged, and,
        wherein the cage, being rotatably arranged, comprises through-holes for passing liquid hydrogen into a gap between the pump housing and the cage enabling a hydrostatic bearing.

\* \* \* \* \*